US012755712B2

(12) United States Patent
Chen et al.

(10) Patent No.: US 12,755,712 B2
(45) Date of Patent: Oct. 6, 2026

(54) METHOD FOR MAINTAINING OPTICAL QUALITY OF DISPLAY AND DISPLAY THEREOF

(71) Applicant: AUO Display Plus Corporation, Hsinchu City (TW)

(72) Inventors: Po-Kun Chen, Hsinchu City (TW); Ai-Ling Lin, Hsinchu City (TW); Ting-Ting Kuo, Hsinchu City (TW)

(73) Assignee: AUO Display Plus Corporation, Hsinchu City (TW)

( * ) Notice: Subject to any disclaimer, the term of this patent is extended or adjusted under 35 U.S.C. 154(b) by 0 days.

(21) Appl. No.: 19/000,756

(22) Filed: Dec. 24, 2024

(65) Prior Publication Data

US 2025/0131889 A1 Apr. 24, 2025

(30) Foreign Application Priority Data

Dec. 5, 2024 (TW) ................................ 113147316

(51) Int. Cl.
*G09G 3/34* (2006.01)
*G09G 3/20* (2006.01)
*G09G 5/10* (2006.01)

(52) U.S. Cl.
CPC ............. *G09G 3/3406* (2013.01); *G09G 3/20* (2013.01); *G09G 5/10* (2013.01); *G09G 2300/0819* (2013.01); *G09G 2310/0243* (2013.01); *G09G 2310/0264* (2013.01); *G09G 2320/0233* (2013.01); *G09G 2320/0276* (2013.01); *G09G 2320/045* (2013.01); *G09G 2320/0626* (2013.01); *G09G 2320/0673* (2013.01); *G09G 2360/16* (2013.01)

(58) Field of Classification Search
CPC .......... G09G 3/20; G09G 3/3406; G09G 5/10; G09G 2300/0819; G09G 2310/0243; G09G 2310/0264; G09G 2320/0233; G09G 2320/0276; G09G 2320/045; G09G 2320/0626; G09G 2320/0673; G09G 2360/16
See application file for complete search history.

(56) References Cited

U.S. PATENT DOCUMENTS

2007/0052735 A1* 3/2007 Chou ..................... H04N 17/04 348/E17.005
2020/0202801 A1* 6/2020 Lee ...................... G09G 3/3685
(Continued)

*Primary Examiner* — William Boddie
*Assistant Examiner* — Saifeldin E Elnafia

(57) ABSTRACT

A method for maintaining optical quality of a display and a display thereof are provided, wherein the display includes a backlight unit, a display unit, and a driving unit, and the method includes: providing a preset gamma value of the display; driving the driving unit based on the preset gamma value of the display to obtain a first display luminance corresponding to the backlight unit according to the preset gamma value; performing local dimming of the backlight unit in the display to obtain a second display brightness value of each area in the measured backlight unit; receiving, by the driving unit, the second display brightness value to compare the second display brightness value with the first display brightness value for obtaining a luminance difference; and providing the brightness difference into the backlight unit for brightness compensation, so that the backlight unit has a third display brightness value.

12 Claims, 4 Drawing Sheets

(56) References Cited

U.S. PATENT DOCUMENTS

| | | | | |
|---|---|---|---|---|
| 2020/0365113 | A1 | 11/2020 | Chen et al. | |
| 2022/0351692 | A1* | 11/2022 | Chen | G09G 3/3406 |
| 2023/0222633 | A1* | 7/2023 | Min | G06F 1/03 382/100 |
| 2024/0185755 | A1* | 6/2024 | Sun | G09G 3/36 |
| 2024/0321171 | A1* | 9/2024 | Cheng | G09G 5/10 |

* cited by examiner

METHOD FOR MAINTAINING OPTICAL QUALITY OF DISPLAY AND DISPLAY THEREOF

CROSS-REFERENCE TO RELATED PATENT APPLICATION

This application claims priority to Taiwan Patent Application No. 113147316, filed on Dec. 5, 2024. The entire contents of Taiwan Patent Application No. 113147316 is incorporated herein by reference.

FIELD OF THE INVENTION

The disclosure relates to a backlight compensation technology, and in particular to a method for maintaining optical quality of a display and a display thereof.

BACKGROUND OF THE INVENTION

Conventional sub-millimeter light-emitting diode (LED) displays may not be able to maintain optical performance in key optical characteristics during local dimming because the dimming algorithms are mainly focused on power saving, for example, the gamma value may change from 2.2 to 2.8 after local dimming, as shown in FIG. 1. This may lead to lower resolution and distortion of image data, for example, darkening of the whole display screen, resulting in distortion of shadow details. In addition, sub-millimeter light-emitting diodes may realize luminance compensation by using an extended light source or by directly increasing luminance of image data, but both will cause generation and/or a substantial increase of a halo, which also causes a reduction in resolution and distortion of the image data.

SUMMARY OF THE INVENTION

The disclosure provides a method for maintaining optical quality of a display capable of maintaining a luminance without reducing a resolution of image data, and a display thereof, which can reduce the halo and maintain the luminance and the gamma value under different windows sizes.

The disclosure provides a display, including a backlight unit, a display unit, and a driving unit coupling the backlight unit and the display unit. The driving unit is configured to perform a method for maintaining optical quality of a display, including the following operations: providing a preset gamma value of the display; driving the driving unit based on the preset gamma value of the display to obtain a first display luminance corresponding to the backlight unit according to the preset gamma value; performing local dimming of the backlight unit in the display to obtain a second display luminance of each area in the measured backlight unit; receiving, by the driving unit, the second display luminance to compare the second display luminance with the first display luminance for obtaining a luminance difference; and providing the luminance difference into the backlight unit for luminance compensation, so that the backlight unit has a third display luminance.

The disclosure provides a method for maintaining optical quality of a display. The display has a driving unit, a display unit and a backlight unit. The method for maintaining optical quality of a display includes: providing a preset gamma value of the display; driving the driving unit based on the preset gamma value of the display to obtain a first display luminance corresponding to the backlight unit according to the preset gamma value; performing local dimming of the backlight unit in the display to obtain a second display luminance of each area in the measured backlight unit; receiving, by the driving unit, the second display luminance to compare the second display luminance with the first display luminance for obtaining a luminance difference; and providing the luminance difference into the backlight unit for luminance compensation, so that the backlight unit has a third display luminance.

In an example of the disclosure, the method for maintaining optical quality of a display further includes: lowering the preset gamma value of the display to a first gamma value.

In an example of the disclosure, the method for maintaining optical quality of a display further includes: adjusting the luminance difference based on a gamma difference between a second gamma value after the luminance compensation of the backlight unit and the preset gamma value.

In an example of the disclosure, the driving the driving unit based on the preset gamma value of the display to obtain the first display luminance corresponding to the backlight unit according to the preset gamma value includes: calculating a base number based on a black screen grayscale measured value and a white screen grayscale measured value of the backlight unit, and raising the base number to the power of the preset gamma value, thereby obtaining the first display luminance of the backlight unit.

In an example of the disclosure, the performing the local dimming of the backlight unit in the display includes: obtaining an area peak luminance of each area in the backlight unit; obtaining a windows size of the backlight unit and a corresponding luminance dependency of windows size; and performing a product of the area peak luminance of each area and the luminance dependency of windows size to obtain the second display luminance of each area in the backlight unit.

According to the disclosure, before the local dimming, by pre-lowering the gamma value of the display, compensating for the luminance difference of the backlight unit and adjusting the luminance dependency of windows size of the backlight unit according to different windows sizes, an adjustable backlight compensation manner capable of maintaining the luminance and the optical quality without reducing the resolution of the image data is achieved, the halo can be reduced, and the luminance and the gamma value can be maintained under different windows sizes.

DETAILED DESCRIPTION OF PREFERRED EMBODIMENTS

Figure 1:
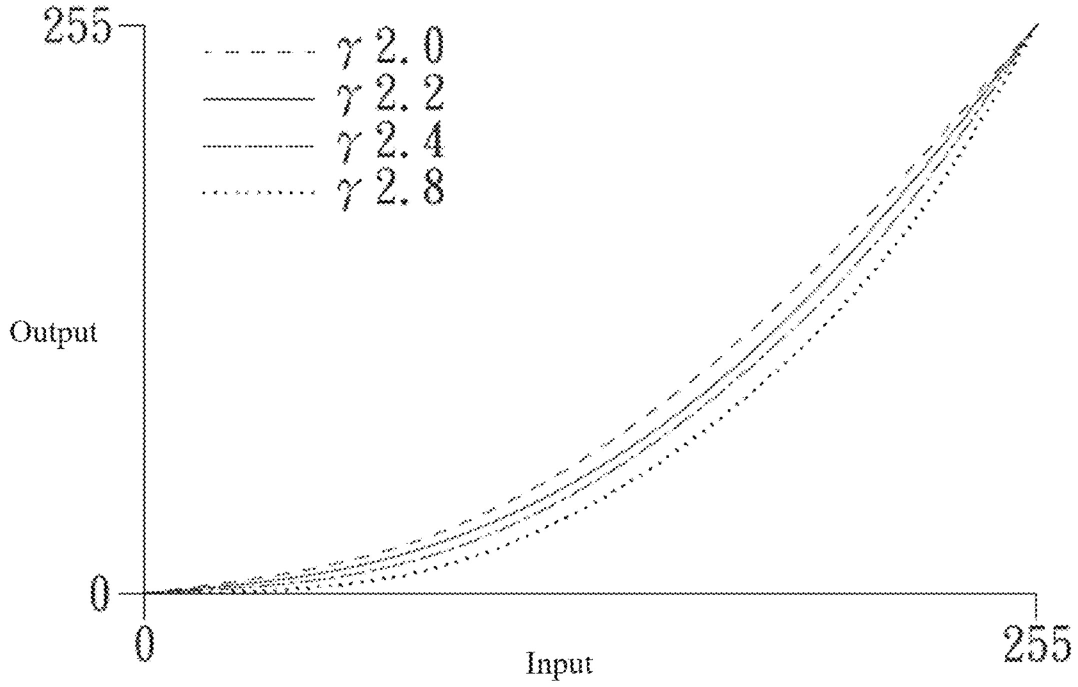
FIG. 1 (Prior Art)
FIG. 1 is a curve graph of a gamma value of a display.

The present invention will now be described more specifically with reference to the following embodiments. The embodiments are intended for purpose of illustration and description only, because various alterations and modifications can be made to those skilled in the art without departing from the spirit and scope of this disclosure. The protection scope of this disclosure should be subject to the application scope of the appended patent. Throughout the specification and the scope of the patent application, the meanings of "a" and "the" include that such statement includes "one or at least one" component or ingredient, unless contents are clearly specified. In addition, as used herein, singular article also includes the statement of plural components or ingredients, unless it is obvious from a specific context that plural is excluded. Moreover, unless contents are clearly specified in the description and all the following scopes of the patent application, the meaning of "therein" can include "therein" and "thereon". Unless otherwise specified, terms used in the specification and the scope of the patent application usually have the ordinary meanings of each term used in the field, in contents disclosed herein and in special contents. Some words intended to describe the present invention will be discussed below or elsewhere in the specification to provide additional guidance for a practitioner in terms of the description of the present invention. Examples anywhere in the specification, including examples of any words discussed herein, are intended for purpose of illustration and description only, and certainly do not limit the scope and significance of the present invention or any illustrative words. Similarly, the present invention is not limited to various embodiments set forth in the specification.

Words "substantially", "around", "about" or "approximately" used herein should generally mean within 20% of a given value or range, preferably within 10%. In addition, quantities provided herein can be approximate, meaning that the words "around", "about" or "approximately" can be used unless otherwise stated. When quantities, concentrations or other numerical values or parameters are specified in terms of range and preferred range or listed in terms of ideal upper and lower values, it should be deemed as a special disclosure of all ranges formed by any number pairs or ideal values of upper and lower limits, regardless of whether the ranges are disclosed separately. For example, if a specified length in the disclosed range is from X cm to Y cm, the disclosed length should be deemed as H cm and H can be any real number between X and Y.

In addition, the term "electrically coupled" or "electrically connected" includes any direct and indirect manners of electrical connection, if used herein. For example, as described herein, a first device being electrically coupled to a second device means that the first device can be directly connected to the second device or indirectly connected to the second device through other devices or connection manners. In addition, if the transmission and provision of electrical signals are described, persons skilled in the art should understand that attenuation or another non-ideal change may occur during the transmission of the electrical signals. Unless otherwise specified, the source of the transmission or provision of the electrical signals and the receiver of the electrical signals should be substantially deemed as a same signal. For example, if an electrical signal S is transmitted (or provided) by a terminal A of an electronic circuit to a terminal B thereof, a voltage drop may be caused through two terminals of a source electrode of a transistor switch and/or a potential stray capacitor. However, if the design is not to deliberately use the attenuation or another non-ideal change generated during the transmission (or provision) to achieve some specific technical effects, the electrical signal S should be substantially deemed as a same signal at the terminal A of the electronic circuit and the terminal B thereof.

It can be understood that terms "comprising", "including", "having", "containing", "involving" and the like used herein are open-ended, meaning including but not limited to. Moreover, it is not necessary for any embodiment of the present invention or the scope of the patent application to achieve all the purposes, advantages or features disclosed herein. In addition, abstract and title are only intended to assist the search of patent documents, instead of limiting the scope of the patent application of the present invention.

Figure 2:
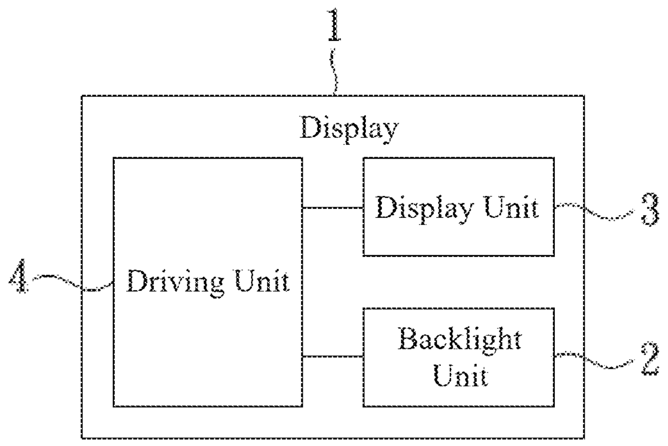
FIG. 2 is a system block diagram of the display according to an example of the disclosure.

FIG. 2 is a system block diagram of a display according to an example of the disclosure. The display 1 provided by this example includes a backlight unit 2, a display unit 3 and a driving unit 4. The backlight unit 2 is a panel including a plurality of sub-millimeter light-emitting diodes to provide backlight of the display 1. The display unit 3 is a panel including a plurality of pixel units to display image data. The driving unit 4 is configured to couple and drive the backlight unit 2 and the display unit 3. In addition, the driving unit 4 is further configured to perform a method for maintaining optical quality of a display.

Figure 3:
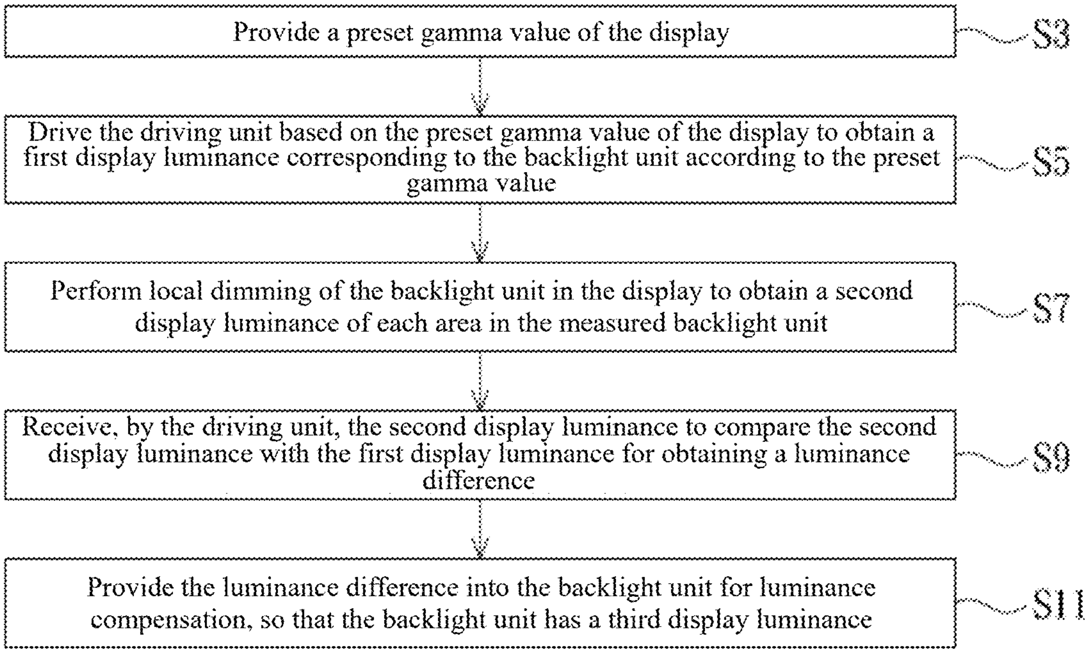
FIG. 3 is a flowchart of a method for maintaining optical quality of a display according to an example of the disclosure.

FIG. 3 is a flowchart of a method for maintaining optical quality of a display according to an example of the disclosure. The method for maintaining optical quality of a display according to this example is performed by the driving unit 4 in the display 1 to include the following operations, where the disclosure does not limit whether the display unit 3 inputs image data. Step S3: Provide a preset gamma value of the display 1. Step S5: Drive the driving unit 4 based on the preset gamma value of the display 1 to obtain a first display luminance corresponding to the backlight unit 2 according to the preset gamma value. Step S7: Perform local dimming of the backlight unit 2 in the display 1 to obtain a second display luminance of each area in the measured backlight unit 2. Step S9: Receive, by the driving unit 4, the second display luminance to compare the second display luminance with the first display luminance for obtaining a luminance difference. Step S11: Provide the luminance difference into the backlight unit 2 for luminance compensation, so that the backlight unit 2 has a third display luminance.

Figure 4:
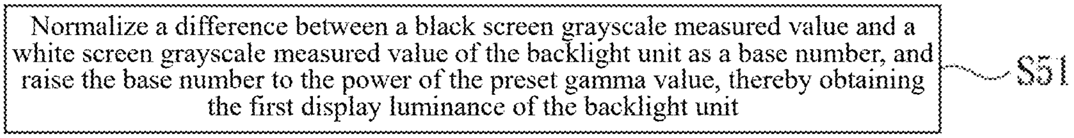
FIG. 4 is a flowchart of obtaining a first display luminance of a backlight unit according to an example of the disclosure.

First, the driving unit 4 is driven based on the preset gamma value of the display 1 to obtain a display luminance of the backlight unit 2. The preset gamma value is, for example, a value of 2.2, but those skilled in the art can set this preset gamma value according to actual needs, so the disclosure is not limited thereto. Specifically, FIG. 4 is a flowchart of obtaining a first display luminance of a backlight unit according to an example of the disclosure. Step S5 further includes the following operation. Step S51: calculating a base number based on a black screen grayscale measured value and a white screen grayscale measured value of the backlight unit 2, and raising the base number to the power of the preset gamma value, thereby obtaining the display luminance of the backlight unit 2. The formula in step S51 is expressed as $(L0\_m+(L255\_m-L0\_m)*(Ln\_m/255))^{\gamma}$, where L0_m denotes the black screen grayscale measured value of the m-th sub-millimeter light-emitting diode, L255_m denotes the white screen grayscale measured value of the m-th sub-millimeter light-emitting diode, Ln_m denotes the grayscale value of the m-th sub-millimeter light-emitting diode corresponding to the preset gamma value, n denotes 0 to 255, and γ denotes the gamma value. It can be noted that in the formula in step S51, 1 sub-millimeter light-emitting diode represents 1 display luminance, which means that the display luminance of the backlight unit 2 includes a plurality of display luminances respectively corresponding to each of a plurality of sub-millimeter light-emitting diodes.

Figure 5:
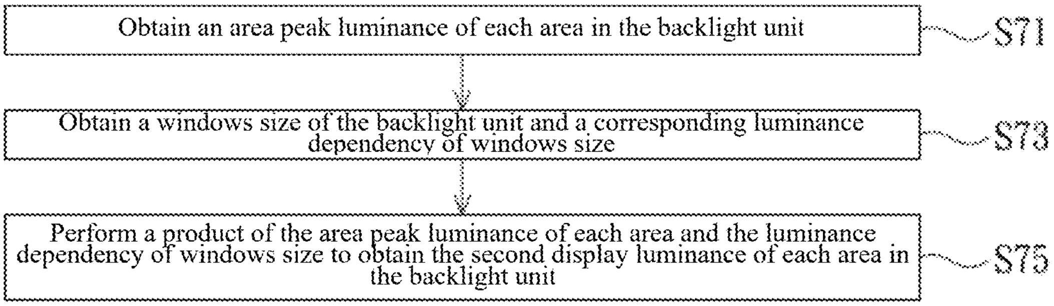
FIG. 5 is a flowchart of performing local dimming of the backlight unit according to an example of the disclosure.
Figure 6:
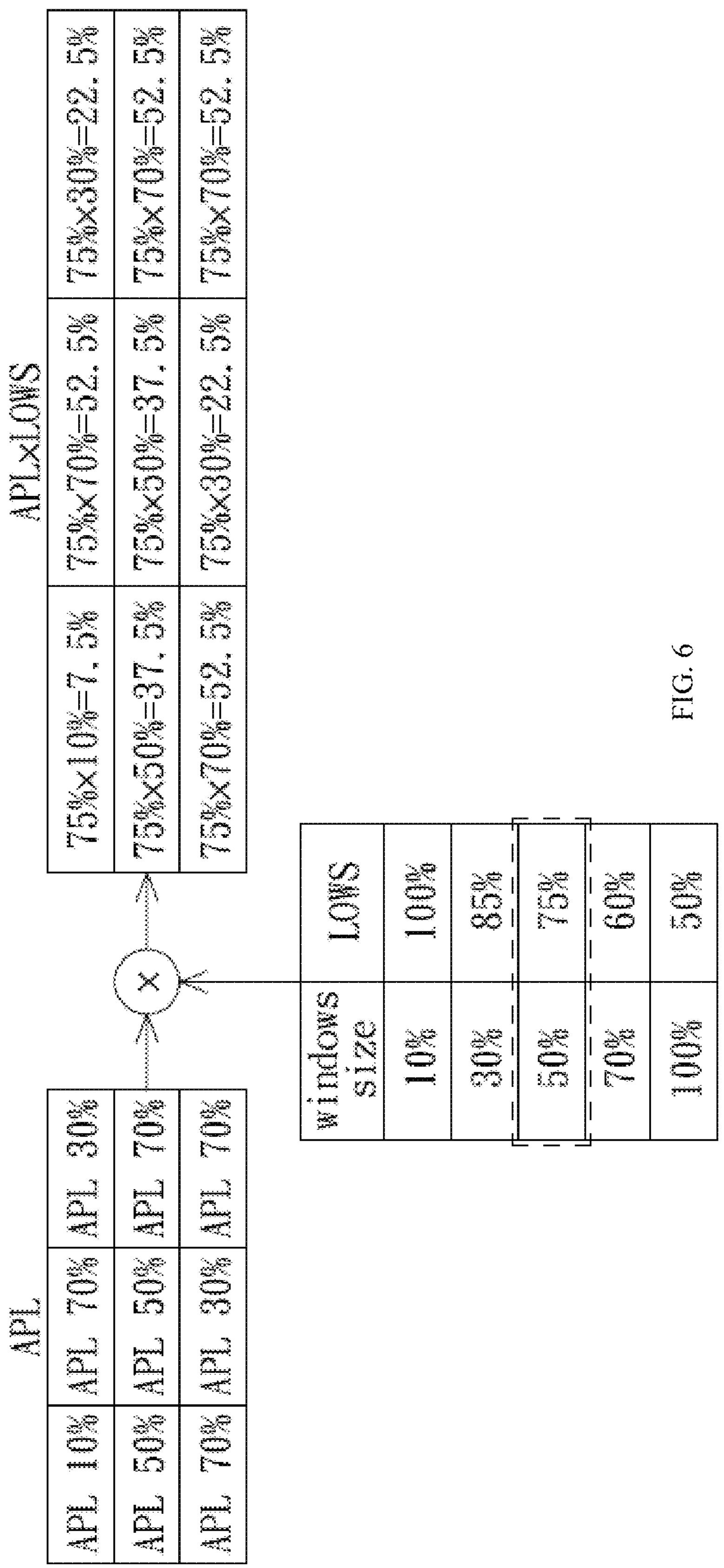
FIG. 6 is a schematic diagram of an area peak luminance and a product thereof with a luminance dependency of windows size according to an example of the disclosure.

Next, the driving unit 4 performs the local dimming of the backlight unit 2 to measure a display luminance of each area in the backlight unit 2. Specifically, FIG. 5 is a flowchart of performing local dimming of the backlight unit according to an example of the disclosure. Step S7 further includes the following operations. Step S71: Obtain an area peak luminance/segment (APL) of each area in the backlight unit 2. Step S73: Obtain a windows size of the backlight unit 2 and a corresponding luminance dependency of windows size (LOWS). Step S75: Perform a product of the area peak luminance of each area and the luminance dependency of windows size (APL*LOWS) to obtain the display luminance of each area in the backlight unit 2. In detail, the driving unit 4 can obtain the display luminance corresponding to each sub-millimeter light-emitting diode in each area after performing the local dimming of the backlight unit 2, thereby obtaining the area peak luminance of this area. It can be noted that the size of each area of the backlight unit 2 after the local dimming may be automatically adjusted according to the image data of the display unit 3 or according to the settings of the backlight unit 2, that is, the area may be as small as a sub-millimeter light-emitting diode and as big as the whole panel, and the area may be in different shapes, such as a rectangle and a polygon, but the disclosure is not limited thereto. Next, the driving unit 4 finds out the corresponding luminance dependency of windows size according to the windows size of the backlight unit 2. The windows size is the ratio of the white screen area in the backlight unit 2 to the panel area of the whole backlight unit 2, different ratios correspond to different luminance dependencies of windows size, and the windows size has an inverse relation with the luminance dependency of windows size, as shown in Table 1. In addition, the white screen area in the backlight unit 2 and the panel area of the whole backlight unit 2 may be in different shapes, such as a rectangle and a polygon, but the disclosure is not limited thereto. Next, the driving unit 4, after obtaining the area peak luminance of each area and the luminance dependency of windows size after the local dimming, performs a product of the area peak luminance of each area and the luminance dependency of windows size to obtain the display luminance of each area in the backlight unit 2. As shown in FIG. 6, the area peak luminance of each area in the backlight unit 2 is shown on the right side in FIG. 6, the ratio of the white screen area in the backlight unit 2 to the panel area of the whole backlight unit 2 is, for example, 50%, the corresponding luminance dependency of windows size is 75%, and the product of the area peak luminance of each area and the luminance dependency of windows size is shown on the left side in FIG. 6. In addition, the number of area peak luminances increases or decreases with the number of areas after the local dimming. FIG. 6 only shows an example, and the disclosure is not limited thereto. It can be noted that after the driving unit 4 performs the local dimming of the backlight unit 2, a halo may be generated, and the preset gamma value of the display 1 may increase, so that the whole screen darkens and the shadow details disappear.

TABLE 1

| Windows size | Luminance dependency of windows size |
|---|---|
| 10% | 100% |
| 30% | 85% |
| 50% | 75% |
| 70% | 60% |
| 100% | 50% |

As shown in FIG. 3, the driving unit 4, after obtaining the display luminances in step S5 and step S7, calculates a luminance difference of the display luminances in the two steps to compensate for the luminance difference into the backlight unit 2. Thereby, in this example, by adjusting the luminance dependency of windows size of the backlight unit 2 according to different windows sizes and compensating for the luminance difference of the backlight unit 2, an adjustable backlight compensation manner capable of maintaining the luminance and the optical quality without reducing the resolution of the image data is achieved, the halo can be reduced, and the luminance and the gamma value can be maintained under different windows sizes.

Figure 7:
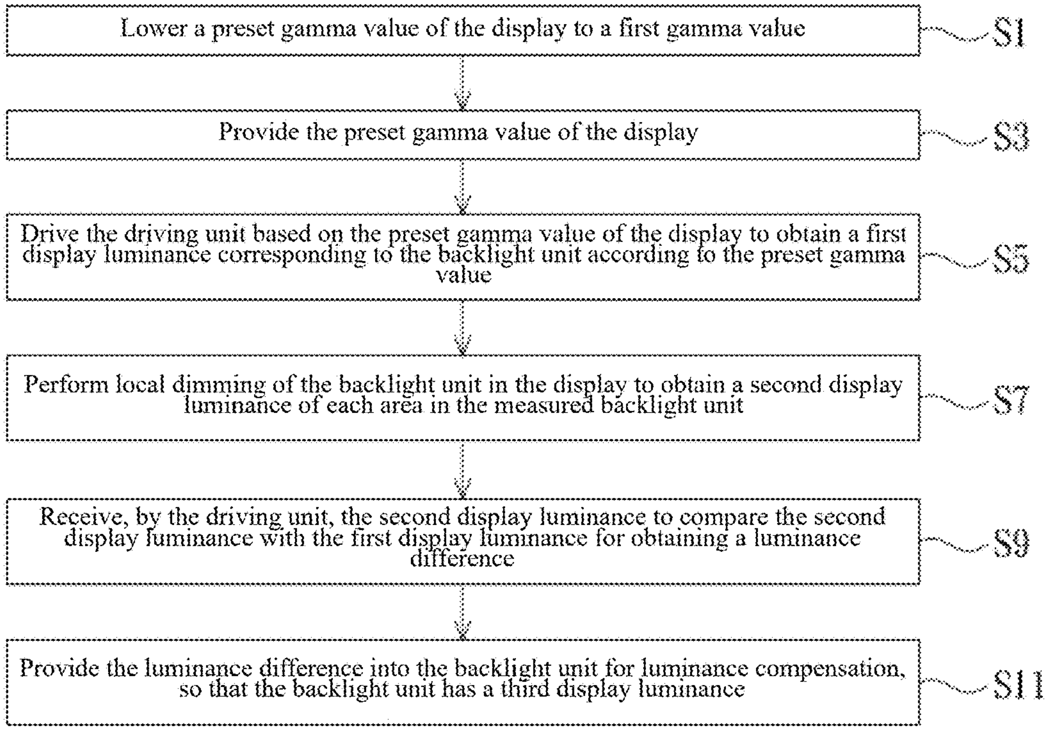
FIG. 7 is a flowchart of a method for maintaining optical quality of a display according to another example of the disclosure.

FIG. 7 is a flowchart of a method for maintaining optical quality of a display according to another example of the disclosure. The method for maintaining optical quality of a display according to this example is performed by the driving unit 4 in the display 1 to include the following operations, where the disclosure does not limit whether the display unit 3 inputs image data. Step S1: Lower a preset gamma value of the display 1 to a first gamma value. Step S3: Provide the preset gamma value of the display 1. Step S5: Drive the driving unit 4 based on the preset gamma value of the display 1 to obtain a first display luminance corresponding to the backlight unit 2 according to the preset gamma value. Step S7: Perform local dimming of the backlight unit 2 in the display 1 to obtain a second display luminance of each area in the measured backlight unit 2. Step S9: Receive, by the driving unit 4, the second display luminance to compare the second display luminance with the first display luminance for obtaining a luminance difference. Step S11: Provide the luminance difference into the backlight unit 2 for luminance compensation, so that the backlight unit 2 has a third display luminance. It can be noted that steps S3, S5, S7, S9 and S11 in this example are the same as steps S3, S5, S7, S9 and S11 in the previous example, and thus, will not be repeated here. In this example, step S1 is performed because after the local dimming of the backlight unit 2, the preset gamma value of the display 1 will increase, for example, from 2.2 to 2.4, so that the whole screen darkens and the shadow details disappear. As a result, the purpose of step S1 is to pre-lower (compensate) the preset gamma value of the display 1, for example, from 2.2 to 2.0 before the local dimming of the backlight unit 2 to make the whole screen brighter, so as to avoid darkening of the whole screen and disappearance of the shadow details after the local dimming of the backlight unit 2. Thereby, in this example, by pre-lowering the gamma value of the display 1, adjusting the luminance dependency of windows size of the backlight unit 2 according to different windows sizes and compensating for the luminance difference of the backlight unit 2 before the local dimming, an adjustable backlight compensation manner capable of maintaining the luminance and the optical quality without reducing the resolution of the image data is achieved, overexposure caused by an over-bright screen and disappearance of shadow details caused by an over-dark screen can be avoided, the halo can be reduced, and the luminance and the gamma value can be maintained under different windows sizes.

Figure 8:
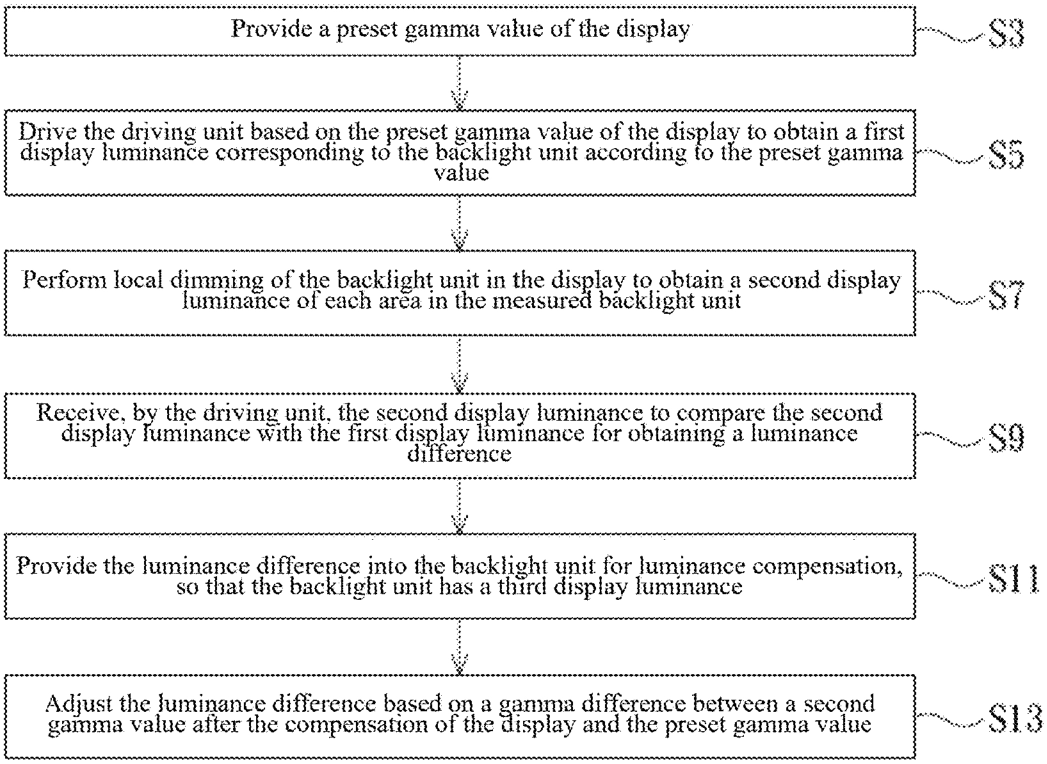
FIG. 8 is a flowchart of a method for maintaining optical quality of a display according to still another example of the disclosure.

FIG. 8 is a flowchart of a method for maintaining optical quality of a display according to still another example of the disclosure. The method for maintaining optical quality of a display according to this example is performed by the driving unit 4 in the display 1 to include the following operations, where the disclosure does not limit whether the display unit 3 inputs image data. Step S3: Provide a preset gamma value of the display 1. Step S5: Drive the driving unit 4 based on the preset gamma value of the display 1 to obtain a first display luminance corresponding to the backlight unit 2 according to the preset gamma value. Step S7: Perform local dimming of the backlight unit 2 in the display 1 to obtain a second display luminance of each area in the measured backlight unit 2. Step S9: Receive, by the driving unit 4, the second display luminance to compare the second display luminance with the first display luminance for obtaining a luminance difference. Step S11: Provide the luminance difference into the backlight unit 2 for luminance compensation, so that the backlight unit 2 has a third display luminance. Step S13: Adjust the luminance difference based on a gamma difference between a second gamma value after the compensation of the display 1 and the preset gamma value. It can be noted that steps S3, S5, S7, S9 and S11 in this example are the same as steps S3, S5, S7, S9 and S11 in the previous example, and thus, will not be repeated here. In this example, the driving unit 4, after compensating for the luminance difference into the backlight unit 2, measures the gamma value of the display 1 again to determine the gamma difference between the measured gamma value and the preset gamma value, so as to adjust the luminance difference again such that the gamma value of the display 1 approaches to the preset gamma value. The formula in step S11 is expressed as $\Delta\gamma=\gamma_{default}-\log_{n/255}((Ln\_m-L0\_m)/(L255\_m-L0\_m))$, where L0_m denotes the black screen grayscale measured value of the m-th sub-millimeter light-emitting diode, L255_m denotes the white screen grayscale measured value of the m-th sub-millimeter light-emitting diode, Ln_m denotes the grayscale value of the m-th sub-millimeter light-emitting diode corresponding to the preset gamma value, n denotes 0 to 255, $\gamma_{default}$ denotes the preset gamma value, and $\Delta\gamma$ denotes the gamma difference. Thereby, in this example, by adjusting the luminance dependency of windows size of the backlight unit 2 according to different windows sizes and compensating for and finely adjusting the luminance difference of the backlight unit 2, an adjustable backlight compensation manner capable of maintaining the luminance and the optical quality without reducing the resolution of the image data is achieved, the halo can be reduced, and the luminance and the gamma value can be maintained under different windows sizes.

In an example, the method for maintaining optical quality of a display is performed by the driving unit 4 in the display 1 provided by the disclosure, and may include all of steps S1, S3, S5, S7, S9, S11 and S13 in the above examples. Steps S1, S3, S5, S7, S9, S11 and S13 in this example are the same as steps S1, S3, S5, S7, S9, S11 and S13 in the above examples, and thus, will not be repeated here. Thereby, in this example, by pre-lowering the gamma value of the display 1, adjusting the luminance dependency of windows size of the backlight unit 2 according to different windows sizes and compensating for and finely adjusting the luminance difference of the backlight unit 2 before the local dimming, an adjustable backlight compensation manner capable of maintaining the luminance and the optical quality without reducing the resolution of the image data is achieved, overexposure caused by an over-bright screen and disappearance of shadow details caused by an over-dark screen can be avoided, the halo can be reduced, and the luminance and the gamma value can be maintained under different windows sizes.

Based on the above, according to the method for maintaining optical quality of a display and the display thereof provided by the disclosure, by pre-lowering the gamma value of the display, compensating for and finely adjusting the luminance difference of the backlight unit and adjusting the luminance dependency of windows size of the backlight unit according to different windows sizes before the local dimming, an adjustable backlight compensation manner capable of maintaining the luminance and the optical quality without reducing the resolution of the image data is achieved, overexposure caused by an over-bright screen and disappearance of shadow details caused by an over-dark screen can be avoided, the halo can be reduced, and the luminance and the gamma value can be maintained under different windows sizes.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for maintaining optical quality of a display, the display having a driving unit, a display unit and a backlight unit, the method comprising:

providing a preset gamma value of the display;

driving the driving unit based on the preset gamma value of the display to obtain a first display luminance of the backlight unit according to the preset gamma value of the display;

performing local dimming of the backlight unit in the display to obtain a second display luminance of each area in the measured backlight unit;

receiving, by the driving unit, the second display luminance to compare the second display luminance with the first display luminance for obtaining a luminance difference; and providing the luminance difference into the second display luminance of the backlight unit for luminance compensation, so that the backlight unit has a third display luminance;

wherein the step of driving the driving unit based on the preset gamma value of the display to obtain the first display luminance of the backlight unit according to the preset gamma value of the display comprises:

calculating a base number based on a black screen grayscale measured value and a white screen grayscale measured value of the backlight unit, and raising the base number to the power of the preset gamma value, thereby obtaining the first display luminance of the backlight unit;

wherein a formula for obtaining the first display luminance is expressed as $(L0\_m+(L255\_m-L0\_m)*(Ln\_m/255))^{\gamma}$, where L0_m denotes the black screen grayscale measured value of the m-th sub-millimeter light-emitting diode, L255_m denotes the white screen grayscale measured value of the m-th sub-millimeter light-emitting diode, Ln_m denotes the grayscale value of the m-th sub-millimeter light-emitting diode corresponding to the preset gamma value, n denotes 0 to 255, and γ denotes the gamma value.

2. The method for maintaining optical quality of a display according to claim 1, further comprising:

lowering the preset gamma value of the display to a first gamma value.

3. The method for maintaining optical quality of a display according to claim 1, further comprising:

adjusting the luminance difference based on a gamma difference between a second gamma value after the luminance compensation of the backlight unit and the preset gamma value.

4. The method for maintaining optical quality of a display according to claim 3, wherein the gamma difference is calculated for the m-th sub-millimeter light-emitting diode by a logarithmic formula expressed as: $\Delta\gamma=\gamma_{default}-\log_{n/255}((Ln\_m-L0\_m)/(L255\_m-L0\_m))$, where Δγ denotes the gamma difference, $\gamma_{default}$ denotes the preset gamma value.

5. The method for maintaining optical quality of a display according to claim 1, wherein the performing the local dimming of the backlight unit in the display comprises:

obtaining an area peak luminance of each area in the backlight unit;

obtaining a windows size of the backlight unit and a corresponding luminance dependency of the windows size; and performing a product of the area peak luminance of each area and the luminance dependency of the windows size to obtain the second display luminance of each area in the backlight unit.

6. The method for maintaining optical quality of a display according to claim 1, wherein the step of performing local dimming of the backlight unit further comprises automatically adjusting a size of each area of the backlight unit according to an image data, and the size of each area ranges from a single sub-millimeter light-emitting diode to a whole panel.

7. A display, comprising:

a backlight unit;

a display unit; and a driving unit, coupling the backlight unit and the display unit and configured to perform the following operations:

providing a preset gamma value of the display;

driving the driving unit based on the preset gamma value of the display to obtain a first display luminance of the backlight unit according to the preset gamma value of the display;

performing local dimming of the backlight unit in the display to obtain a second display luminance of each area in the measured backlight unit;

receiving, by the driving unit, the second display luminance to compare the second display luminance with the first display luminance for obtaining a luminance difference; and providing the luminance difference into the second display luminance of the backlight unit for luminance compensation, so that the backlight unit has a third display luminance;

wherein the step of driving the driving unit based on the preset gamma value of the display to obtain the first display luminance of the backlight unit according to the preset gamma value of the display comprises:

calculating a base number based on a black screen grayscale measured value and a white screen grayscale measured value of the backlight unit, and raising the base number to the power of the preset gamma value, thereby obtaining the first display luminance of the backlight unit;

wherein a formula for obtaining the first display luminance is expressed as $(L0\_m+(L255\_m-L0\_m)*(Ln\_m/255))^{\gamma}$, where L0_m denotes the black screen grayscale measured value of the m-th sub-millimeter light-emitting diode, L255_m denotes the white screen grayscale measured value of the m-th sub-millimeter light-emitting diode, Ln_m denotes the grayscale value of the m-th sub-millimeter light-emitting diode corresponding to the preset gamma value, n denotes 0 to 255, and γ denotes the gamma value.

8. The display according to claim 7, wherein the driving unit further performs:

lowering the preset gamma value of the display to a first gamma value.

9. The display according to claim 7, wherein the driving unit further performs:

adjusting the luminance difference based on a gamma difference between a second gamma value after the luminance compensation of the backlight unit and the preset gamma value.

10. The display according to claim 9, wherein the gamma difference is calculated for the m-th sub-millimeter light-emitting diode by a logarithmic formula expressed as: $\Delta\gamma=\gamma_{default}-\log_{n/255}((Ln\_m-L0\_m)/(L255\_m-L0\_m))$, where Δγ denotes the gamma difference, $\gamma_{default}$ denotes the preset gamma value.

11. The display according to claim 7, wherein the performing the local dimming of the backlight unit in the display comprises:

obtaining an area peak luminance of each area in the backlight unit;

obtaining a windows size of the backlight unit and a corresponding luminance dependency of the windows size; and performing a product of the area peak luminance of each area and the luminance dependency of the windows size to obtain the second display luminance of each area in the backlight unit.

12. The display according to claim 7, wherein the driving unit is configured to automatically adjust a size of each area of the backlight unit according to an image data, and the driving unit is further configured to adjust the size of each area within a range from a single sub-millimeter light-emitting diode to a whole panel.

* * * * *